No. 836,917. PATENTED NOV. 27, 1906.
J. O. BROWN, Sr.
CORN PLANTER.
APPLICATION FILED NOV. 27, 1905.
2 SHEETS—SHEET 1.
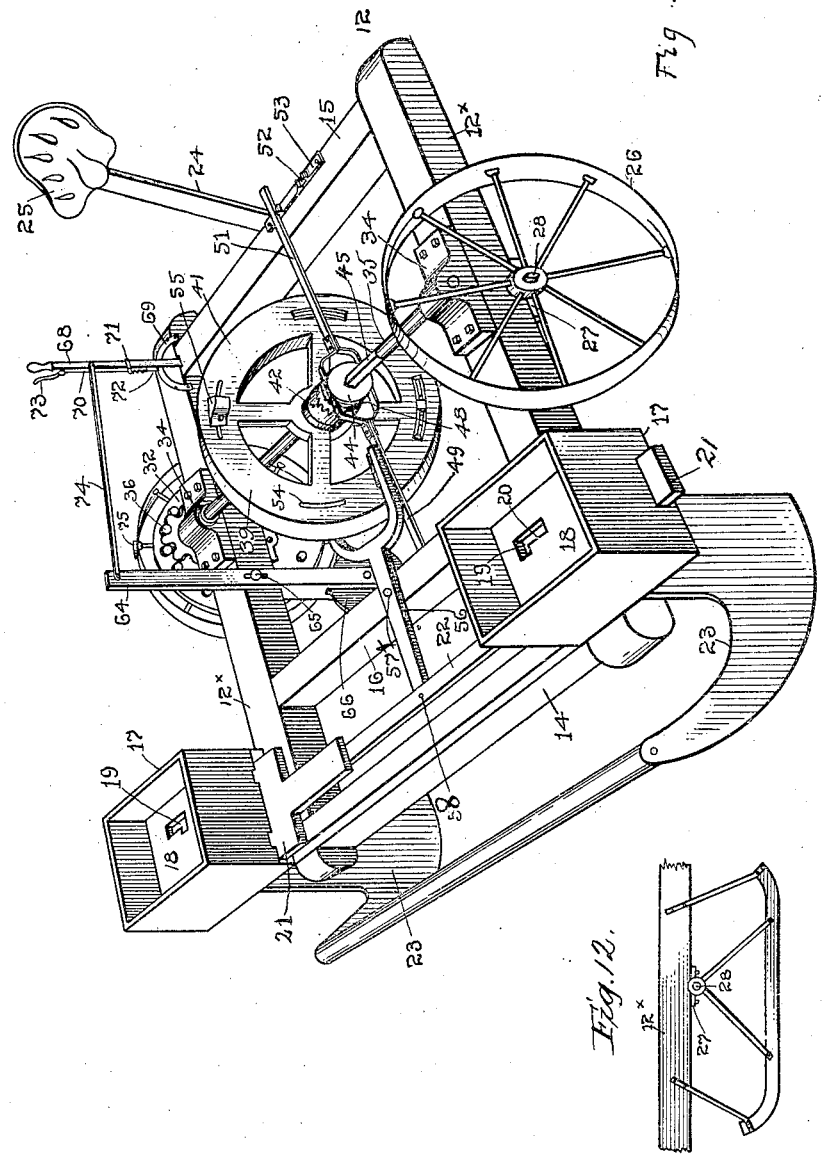
WITNESSES:
INVENTOR
James O. Brown Sr.
BY
Richd. Manning
ATTORNEY
THE NORRIS PETERS CO., WASHINGTON, D. C.

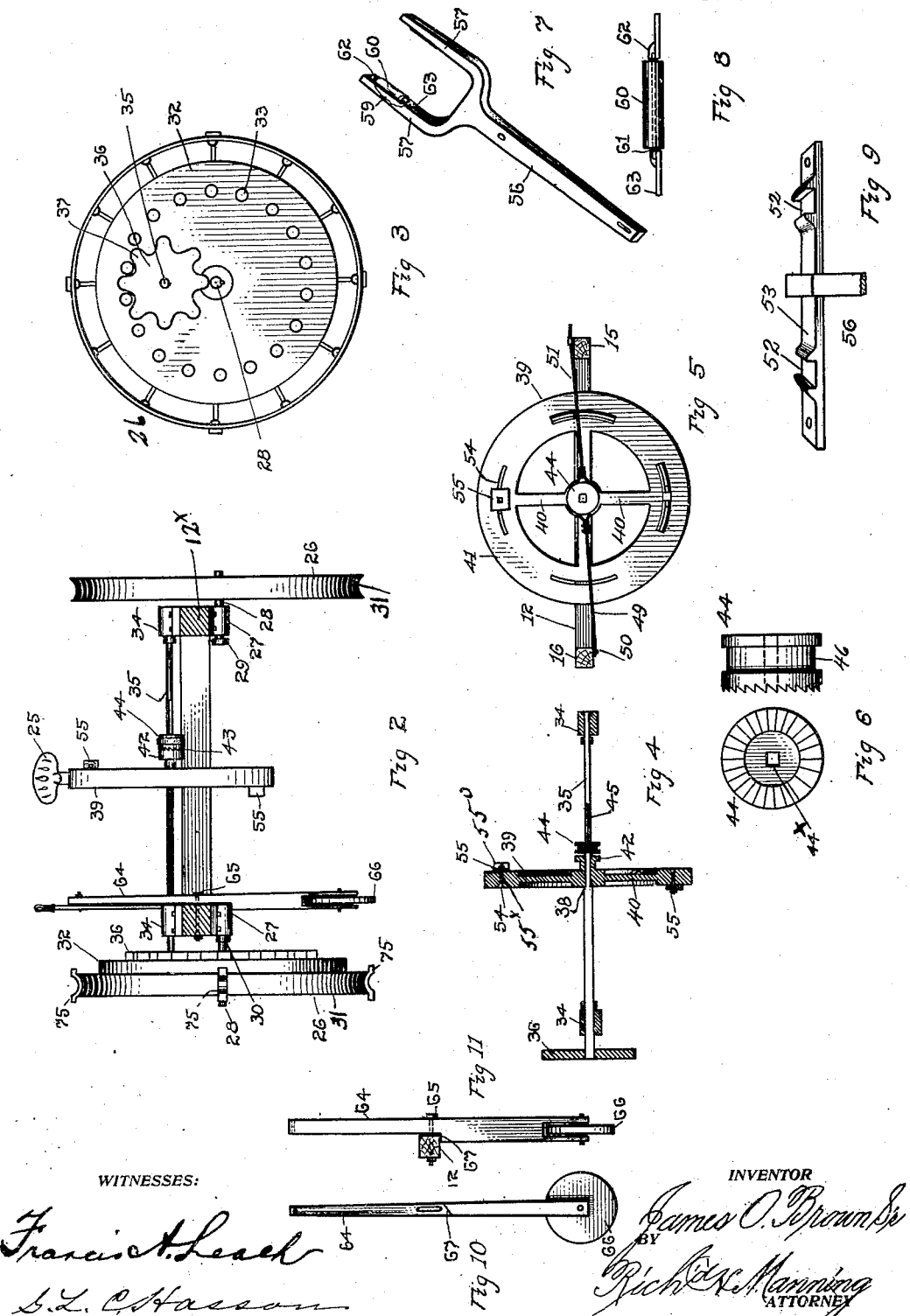

UNITED STATES PATENT OFFICE.

JAMES O. BROWN, SR., OF KANSAS CITY, MISSOURI, ASSIGNOR OF ONE-FIFTH TO WILLIAM E. BROWN, ONE-FIFTH TO JAMES O. BROWN, JR., ONE-FIFTH TO WILLIAM T. JAMISON, AND ONE-TENTH TO RICHARD H. MANNING, OF KANSAS CITY, MISSOURI.

CORN-PLANTER.

No. 836,917.      Specification of Letters Patent.      Patented Nov. 27, 1906.

Application filed November 27, 1905. Serial No. 289,308.

*To all whom it may concern:*

Be it known that I, JAMES O. BROWN, Sr., a citizen of the United States of America, residing at Kansas City, in the county of Jackson and State of Missouri, have invented certain new and useful Improvements in Corn-Planters; and I do hereby declare that the following is a full, clear, and exact description of the invention, such as will enable others to make and use the same, reference being had to the accompanying drawings, forming a part of this specification.

The objects of my invention are, first, to effect the instantaneous dropping of the seed at regulated and uniform distances apart without the aid of the ordinary check-row appliances; second, to afford means for transmitting to the seed-dropping devices a reciprocal movement from a starting-point of the planter in the direct line of the row to be planted without scattering; third, to increase and decrease the action of the seed-dropping devices during the passage of the planter over measured distances of ground; fourth, to enable the planting of the corn or other seed in drills or cross-rows without changing the seed-dropping plates; fifth, to communicate the power to actuate the seed-dropping devices direct from the drive-wheel and independently of the axle of the planter; sixth, to disconnect the power-transmitting mechanism from the seed-dropping devices at any given point and adjust the mechanism in position to effect the dropping of the seed at corresponding distances apart; seventh, to enable the planter to be moved rearwardly to the desired starting-point of a row while one of the drive-wheels is raised above the ground; eighth, to indicate the planted hills after the passage of the planter; ninth, to effect correspondence in the hills of planted corn in the distance from one hill to the other and the subsequent marking of the hills by the markers on the drive-wheels as the new row is planted.

The invention consists in the novel construction and combination of parts, such as will be first fully described and then specifically pointed out in the claims.

In the drawings, Figure 1 is a view in perspective of the planter, showing the novel features of the invention. Fig. 2 is a transverse vertical sectional view taken through the frame of the planter immediately forward of the ground-wheel. Fig. 3 is a detail inner side view of one of the ground-wheels, showing the disk secured thereto, its cogs, and the cog-wheel carried by the disk. Fig. 4 is a detail sectional view of the cog-wheel and shaft and the rotary adjustable cams actuating the seed-dropping devices and the means for disconnecting the mechanism from the seed-dropping devices. Fig. 5 is a detail side view of the cam-supporting wheel, showing portions of the planter-frame, the driving-shaft, and clutch and clutch-operating devices. Fig. 6 represents detail side and front views of the clutch. Fig. 7 is a detail enlarged view of the forked oscillating lever, showing the antifriction-rollers. Fig. 8 is a side view of one of the rollers and roller-supports detached from the forked lever. Fig. 9 is a detail enlarged view of the notched plate on the rear transverse beam of the planter for holding the clutch-operating lever. Figs. 10 and 11 are detail front and side views, respectively, of the lifting-jack; and Fig. 12 is a side view of a runner in modification of one of the ground-wheels.

Similar numerals of reference indicate corresponding parts in all the figures of the drawings.

Referring to the drawings, 12 indicates the frame of the planter, which consists of a rectangular-shaped frame of which $12^\times$ $12^\times$ are the side beams and 14 the transverse beam connected with the forward ends of beams $12^\times$, and 15 the transverse beam connected with the rear ends of said beams. At a point a short distance in rear of the forward transverse beam 14 is a transverse beam 16, connected with the inner surfaces of the beams $12^\times$.

Upon the forward ends of the beams $12^\times$ are mounted the seedboxes 17, in the bottom 18 of which are the openings 19 for the seed. 21 indicates the seed-dropping plates beneath the bottom 18 of the seedboxes, having openings 20, which openings 19 and 20 are caused to register in the reciprocal movements of the seed-dropping plate in the usual manner. 22 is a bar connecting one of the seed-dropping plates 21 beneath the bottom of one of the seedboxes with the plate 21 beneath the other seedbox. 23 indicates furrow-openers connected with the outer surfaces and forward ends of the side beams $12^\times$ and are of the usual construction. 24 is a seat-supporting bar connected with the rear transverse beam 15, upon which is the driver's seat 25. Upon the under surface of the side beams $12^\times$, about midway the length of said beams, are connected the journal-boxes 27, in which boxes are journaled the ground-wheels 26, each ground-wheel being provided with a short journal 28, which journals are mounted in the said journal-boxes 27 and provided with an enlargement or head 29 on the inner end of the journals, (see Fig. 2,) one of the journals 28 on the right side of the planter being slightly longer than the journal on the left side of the planter and is provided with a collar 30, adjacent to the outer side portion of the journal-box. The ground-wheels are grooved upon the periphery, as at 31, so as to avoid tamping the planted hills or rows.

Attached firmly to the inner side of the right drive-wheel 26 is a disk 32, the circumference of which is considerably less than that of the drive-wheel. Upon the inner surface of the disk are cogs or pins 33, extending a short distance outwardly from the surface of the disk and arranged in position a short distance inwardly from the circumference of the disk and in a line concentric with the said circumference. The cogs are properly spaced apart and rotate with the disk in the space between the drive-wheel and the outer surface of the side beam $12^\times$ of the planter-frame.

Upon the upper surface of the side beams $12^\times$ in a vertical line with its journal-boxes 27 are secured the journal-boxes 34, in which boxes is mounted the rotary drive-shaft 35. One end of the shaft 35 in the direction of the right wheel of the planter extends beyond the outer surface of the journal-box 34 a short distance toward and nearly to the disk 32 on said wheel, and upon said end of the shaft is keyed a cog-wheel 36, the teeth 37 of which cog-wheel have their outer ends curved in the arc of a circle and are spaced apart the proper distance to mesh with the cogs 33 on the disk 32. The outer end of shaft 35 from that having the cog-wheel 36 is reduced in circumference from said end a little over one-half way toward the end having said disk, thus forming a shoulder 38. Upon the reduced portion of shaft 35 is a cam-carrying wheel 39, considerably smaller in circumference than the ground-wheels and having spokes 40. The peripheral portion of the wheel consists of an annular plate 41, flat upon both sides. The portion of the hub of the wheel 39 toward the disk-carrying ground-wheel bears against the shoulder 38 at the reduced portion of the shaft 35, so that it will be observed that the cam-carrying wheel 39 is free to rotate at the proper time upon the shaft 35. Upon the other side of the wheel and upon the portion of the hub thereto is connected one portion 42 of a positive clutch, upon the face of which are the clutch-teeth 43. Upon the reduced portion of shaft 35, adjacent to the portion 42 of the clutch, is a sliding portion 44, having a square opening $44^\times$, and upon the shaft 35 is a portion 45, which is rectangular in cross-section, extends within the opening $44^\times$, so that the portion 44 is rotatable with shaft 35, and is movable longitudinally thereon. In the outer surface of the portion 44 of the clutch is an annular groove 46.

48 indicates a yoke which extends within the annular groove 46 in the portion 44 of the clutch. With the forward end of the yoke 48 is connected rigidly one end of a connecting-bar 49, the other end of which bar is extended forwardly and pivotally connected at 50 with the lower surface of the transverse beam 16. (See Fig. 5.) With the rear end of yoke 48 is connected rigidly one end of a clutch-operating lever 51, the other end of which lever extends in the direction of the rear transverse beam 15 of the planter and is retained in position in one of the notches 52 in the plate 53, secured on the upper surface of the beam 15, the notches 52 being at proper distances apart on said plate, so that the lever will hold the clutch from movement when the parts of the clutch are engaged with or disengaged from the other.

In the side portions of plate 41 of the cam-wheel 39 are slots 54. These slots are concentric with the peripheral plate 41. The slots 54 are upon the opposite radial lines to the hub or axis of the wheel; but the number may be increased, as further explained.

55 represents cams one upon each side of plate 41 and opposite the respective slots 54 and for the purpose of discharging corn are equally distant from each other, the outwardly-curved surface of the cams being in the direction of rotation of the wheel 39. With the cams 55 are connected rigidly a screw-threaded stem $55^\times$, which extends through the slots 54 in the wheel 39, and upon the ends of said stems are nuts $55^0$. For the purpose of drilling seed the number of cams are increased and also the slots in the peripheral plate 41, so that any adjustment of the cams in the distance apart may be accomplished.

56 indicates a forked lever pivotally connected at $57^\times$ at a point between the forked portions and its forward end to the upper surface of the transverse beam 16 at a point equidistant from the beams $12^\times$. The forward end of the forked lever 56 is pivotally connected at 58 with the lower surface of the bar 22, operating the seed-dropping plates 19 at a point equidistant from said plates.

The forked portions 57 of the lever 56 extend rearwardly to a position opposite the respective sides of the cam-carrying wheel 39, so as to be acted upon by the cams 55 and oscillated to and fro in the rotation of the wheel 39. The inner surfaces of the forked portions 57 of the lever 56 are depressed at 59, and in said depressions are antifriction-rollers 60, extending parallel with said inner surfaces and having journals 61 at each end. These journals extend within the sockets 62 on the inner ends and outer surfaces of the plates 63, which are secured to the inner surfaces of the plates 63, which are secured to the inner surfaces of said forked ends of the lever adjacent to the ends of the rollers. These rollers relieve the friction of the cams in the stroke upon the forked lever.

64 indicates the lifting jack or bar, which is pivotally connected at 65 with the inner surface of one of the side beams $12^\times$. The lower end of the bar 64 is forked, and in said forked end is journaled a wheel 66.

68 indicates the jack-operating lever, with which is pivotally connected one end of a connecting rod or link 74, the other end of which link is pivotally connected with the jack-bar 64.

Within the grooved portion 31 of the periphery of the ground-wheel 26, carrying the disk 32, are the markers 75. These markers consist of narrow plates which are bent in the arc of a circle intermediate their ends and connected rigidly with the grooved surface of the periphery of the wheel, the end of the markers being extended laterally a short distance from said periphery and transversely to the curved surface. These markers are arranged in position on the ground-wheel at the distance apart in the direction of its circumference corresponding to the distance between adjacent hills of corn, which is usually about thirty inches, and the markers indicate upon the ground the starting-point of a row and subsequent planted rows.

In the operation of the planter and the mechanism herein described, the position of the planter being at the beginning or starting-point of the rows, the hand-lever 73 on the lever 68 is operated to draw the detent 72 from the notched sector-plate 69 and the lever 68 is moved rearwardly, this movement being readily effected by the driver of the planter from the seat 25, and in the movement of lever 68 the power is transmitted, through link 74, to the upper end of the jack or bar 64, and the lower end of said bar moves forwardly into a vertical position, as seen in Figs. 1 and 2, thereby elevating the adjacent side of the frame of the planter and raising the ground-wheel 26 a short distance above the ground. The weight of the said side of the planter being transferred to the wheel 66 on the lower end of the jack or bar 64, the inclined portion of the laterally-extended portion of said bar beneath beam $12^\times$ acts as a retainer or stop, and the planter may be moved rearwardly any required distance, and when the lever 68 is firmly secured the planter may be moved forwardly or rearwardly until the proper alinements are obtained with the planted rows. The ground-wheel 26, carrying the disk 32, being now elevated and at the beginning or starting-point of the rows the outer end of the lever 51 is raised from the notch in the plate 52, which is readily acomplished by the foot of the driver, and the said end moved from the notch 53, adjacent to the support 24 of the seat 25, laterally from the said support into the outer notch 53, in which movement of the lever the part 43 of the clutch is disengaged from the portion 42, and the cam-carrying wheel is free to be rotated upon the shaft 35. The ground-wheel 26, carrying the disk 32, is then rotated upon the journal 28 to a position in which one of the markers 75 is lowest in position toward the ground and coincident with a line extending vertically through the journal of the ground-wheel. The cam-carrying wheel 39 is then given a partial rotation, in which movement one of the cams 55 is caused to strike one of the forked portions of the lever 56, and the seed-dropping plates 21 are moved into a position so that the openings 20 register with the openings 19 in the seedboxes 17, and the seed is dropped, the position of the cam being immediately beneath the said forked portion of lever. The outer end of the clutch-operating lever 51 is now raised from the outer notch 53 and moved inwardly to the notch adjacent to the seat-support 24 the clutch engages, and the shaft 35 and the cam-carrying wheel are in position to rotate conjointly with each other. The hand latch-lever 73 is then operated to disengage the detent from the notched sector 69 and the lever 68 moved forwardly, and the wheel 66 on the lower end of lever 64 moves upwardly and rearwardly, permitting the ground-wheel 26 to drop at once to the ground, the marker 75 on the wheel entering the ground, so as to indicate the starting-point for dropping the seed. The planter is then drawn forward, the furrow-openers 23 opening the ground for the seed, and in the next quarter-circle of rotation of the ground-wheel the next succeeding marker on the ground-wheel comes into a position in alinement with the corn dropped by the rotation of the cam-carrying wheel 39, and in the continuous forward movement of the planter the dropping of the corn is effected by the alternate strokes of the cams on the forked portions of the lever 56 and a reciprocal movement communicated to the bar 22, operating the seed-dropping plates, in which dropping of the corn in hills are accurately indicated by the markers 75. In the mechanism employed to effect this result a coördinate relation is established between the ground-wheel and the cams on the cam-carrying wheel through the independent rotary shaft 35, which is independent of the axis of the wheels, and in the interval of time which elapses from the position of a marker over one planted hill to the position occupied by a succeeding marker on the ground-wheel upon the succeeding planted hill the cog-wheel 36, which engages with the cogs 33 on the disk 32, communicates to shaft the rotation necessary to impart rotation to the cam-carrying wheel 39 one-half the distance in the circle of rotation of said wheel from a point directly beneath the forked arms 57 of the lever 56 after the stroke has been made by one of the cams 55 upon one portion 57 of the forked lever and in an interval of time in which the succeeding cam comes into contact with the other portion 57 of the forked lever, thus effecting as an important feature— viz., an instantaneous dropping of the corn, preventing scattering, and at regular and accurate distances apart in straight lines in which the corn is dropped. Upon arriving at the end of the row of planted corn the clutch-operating lever 51 is caused to disengage the clutch from the cam-operating wheel 39 and the planter turned about to a position in alinement with the rows of planted corn. The lever 68 is operated, and the jack 64 caused to raise the ground-wheel 26, and, the right side of the planter-frame being now supported on the wheel 66, the position of the planter is again obtained as above set forth and the cam-carrying wheel moved by hand to effect the dropping of the corn in direct alinement with the planted hills. When the clutch-lever is moved to cause the parts of the clutch to engage with each other, the jack or bar 64 is thrown forward, releasing the ground-wheel 26, and the planter again moves forward and the mechanism operated by the power transmitted from the ground-wheel 26. This adjustment in alinement with the rows may be effected at any point or place. In planting seed in drills the number of cams on the wheel 39 are increased in number, thus communicating more frequent reciprocal movements to the seed-dropping plates.

It is obvious that instead of the wheel 39 the cams 55 may be carried by radial arms or spokes and accomplish like results and that the cogs may be connected direct with the ground-wheel, the arrangement as shown, however, being preferred as a mode of attachment with an ordinary ground-wheel.

The invention also enables the planting of the corn by the planter upon declivitous surfaces of ground or upon undulating surfaces where one ground-wheel is raised above the horizontal plane of the other ground-wheel.

Being independent of each other, the mechanism enables the rows to be made in a direct line and the alinement preserved with the cross-rows with the same accuracy as upon level ground. Instead of the left ground-wheel on the planter-frame a runner, as seen in Fig. 12, may be employed.

I am aware that rotary cams have been employed to operate the seed-dropping devices; but I am not aware, however, that cams have been loosely mounted on an independent power-driven shaft and engaged and disengaged at will from such shaft in order to enable the position of the marker in its relation to the row to be planted to be changed at the beginning of a row or elsewhere, so as to obtain at will a correct alinement of the marker with the hills that have already been planted in the respective rows and so that the cam-wheel can at will be made to be out of engagement with the power-driven shaft and so entirely independent that the rotation of the independent shaft and ground-wheels can be made as desired without operating the cam-wheel or disturbing the seed-dropping devices, and also so that the said cam-wheel so mounted can be instantly disengaged and the cam-wheel so adjusted as to hasten the time of the dropping, or to retard the same, so that the drop, if necessary, can be changed to conform to the respective rows already planted and so that when made to so drop to correct any disparity in the proper alinement with the rows already planted. When so corrected, the marker on the ground-wheel can be made, simultaneously by turning the ground-wheel, to conform to the changed time and place of the drop. Such changes in either the time or place of dropping or the place that the marker will indicate upon the ground may be either or both changed at will without disturbing the seed-dropping device, and so that when the entire device is again set in motion no drop will be made until the proper place of alinement for the hill has been reached in conformity with the place at which the drop is desired to be made, and so that these results can be accomplished instantly or as soon as desired, when it is requisite to set the entire device in operation, and also so that the adjustment of the cam-wheel can be so made, if desired, during the rotation of the ground-wheels.

Such modifications of the invention may be employed as is within the scope of the invention.

Having fully described my invention, what I now claim as new, and desire to secure by Letters Patent, is—

1. In a corn-planter a supporting-frame, seed-dropping devices on said frame and ground-wheels, an independently-mounted rotary shaft on said frame, power-transmitting devices connected with the ground-wheel and said independent shaft, a cam-carrying wheel loosely mounted on said independent shaft, cams on said wheel actuating the seed-dropping devices and means for engaging with and disengaging at will said cam-carrying wheel from said independent shaft.

2. In a corn-planter a supporting-frame, seed-dropping devices on said frame and ground-wheels, an independently-mounted rotary shaft on said frame, power-transmitting devices connected with the ground-wheel and said independent shaft, a cam-carrying wheel loosely mounted on said independent shaft carrying independently-adjustable cams for actuating the seed-dropping devices and means for engaging with and disengaging at will said cam-carrying wheel from said independent shaft.

3. In a corn-planter the combination with the supporting-frame, the seed-dropping devices and the ground-wheels of a pivoted forked lever actuating the seed-dropping devices, a rotary shaft independently mounted upon said frame, means for transmitting motion from the ground-wheel to said independent shaft, a cam-carrying wheel loosely mounted upon said shaft and cams thereon adapted to engage alternately with the forked ends of said lever and a clutch for connecting said cam-wheel with said independent rotary shaft.

4. In a corn-planter the combination with the supporting-frame, the seed-dropping devices and the ground-wheels journaled on the sides of said frame, a disk on one of said ground-wheels and cogs on said disk, a marker, a pivoted forked lever actuating the seed-dropping devices, a rotary shaft independently mounted upon said frame, a cog-wheel on said shaft meshing with the cogs on the disk on the ground-wheel, a cam-supporting wheel loosely mounted on said shaft, cams upon said wheel adapted to engage alternately with said forked ends of said lever, a clutch connecting said cam-carrying wheel with the shaft, means for elevating one side of the frame of the planter and its ground-wheel and a clutch-operating lever.

JAMES O. BROWN, Sr.

Witnesses:
MARTIN J. OSTERGARD,
ETTA TOWERS.